(12) United States Patent
Dulles

(10) Patent No.: US 9,861,232 B2
(45) Date of Patent: Jan. 9, 2018

(54) NON-ELECTRIC, COMPACT, VARIABLE WIDTH, PERPENDICULAR ACTION STOVETOP TOASTER BASED ON REFLECTED INFRARED RADIATION (IR)

(71) Applicant: Edward Allen Dulles, Annapolis, MD (US)

(72) Inventor: Edward Allen Dulles, Annapolis, MD (US)

( * ) Notice: Subject to any disclaimer, the term of this patent is extended or adjusted under 35 U.S.C. 154(b) by 43 days.

(21) Appl. No.: 15/168,303

(22) Filed: May 31, 2016

(65) Prior Publication Data

US 2016/0367077 A1   Dec. 22, 2016

Related U.S. Application Data

(60) Provisional application No. 62/173,393, filed on Jun. 10, 2015.

(51) Int. Cl.
*A47J 37/00* (2006.01)
*A47J 37/08* (2006.01)

(52) U.S. Cl.
CPC ........... *A47J 37/0807* (2013.01); *A47J 37/08* (2013.01)

(58) Field of Classification Search
CPC ............................. A47J 37/0807; A47J 37/08
USPC .................. 99/385, 393, 394, 396, 401, 402
See application file for complete search history.

(56) References Cited

U.S. PATENT DOCUMENTS

| | | | | | |
|---|---|---|---|---|---|
| 904,382 | A | * | 11/1908 | Van Patten | A47J 37/0814 126/41 R |
| 1,011,813 | A | * | 12/1911 | Knoblock | A47J 37/08 99/396 |
| 1,212,340 | A | * | 1/1917 | Fluherty | A47J 37/0814 99/389 |
| 1,288,881 | A | * | 12/1918 | Harter | A47J 37/0688 99/390 |
| 1,624,182 | A | * | 4/1927 | Rebora | A47J 37/08 99/391 |
| 3,062,127 | A | * | 11/1962 | Lang | A45C 11/20 126/275 R |

* cited by examiner

*Primary Examiner* — Reginald L Alexander
(74) *Attorney, Agent, or Firm* — Chen-Chi Lin

(57) ABSTRACT

A non-electric stovetop toaster that functions on various types of cooktops and is accommodative of various sizes and thicknesses of food contents. It folds flat to occupy a small, book sized volume and is designed for small kitchens (e.g. boats, motorhomes, cottages, apartments . . . ) where countertop space is too limited for an electric toaster. As with an electric toaster, both sides of the food contents are toasted simultaneously whereby good, even toasting results are produced through the combined action of A) IR diffusers, B) IR reflective sidewalls and C) an air filled heat shield.

12 Claims, 4 Drawing Sheets

NON-ELECTRIC, COMPACT, VARIABLE WIDTH, PERPENDICULAR ACTION STOVETOP TOASTER BASED ON REFLECTED INFRARED RADIATION (IR)

CROSS REFERENCE TO RELATED APPLICATIONS

The present application claims priority to the earlier filed provisional application having EFS ID: 22583991, Application No. 62/173,393 and receipt date 10 Jun. 2015, and hereby incorporates subject matter of the provisional application in its entirety.

BACKGROUND

Field of the Invention (IPC A47337/08)

The present invention relates to non-electric devices for toasting bread, sandwiches and bagels on cooktops of various types including gas, electric and others.

Description of the Related Art

The related art discussion below is based on the following filings:

| Ref. | Number | Date | Inventor | Title |
| --- | --- | --- | --- | --- |
| 1 | U.S. Pat. No. 904,382 A | 1908 Nov. 17 | HORACE S. VAN PATTEN | Cooking utensil |
| 2 | U.S. Pat. No. 3,394,648 A | 1968 Jul. 30 | Joseph R. Kring | Portable Broiler |
| 3 | U.S. Pat. No. 2,526,437 A | 1950 Oct. 17 | John Themascus, Sr. | Toaster |
| 4 | U.S. Pat. No. 1,202,059 A | 1916 Oct. 24 | HERMAN M. GREENER | Bread-toaster |
| 5 | GB 10455 A | 1912 Apr. 25 | John Maurice Brock | Improvements in Toasters |
| 6 | U.S. Pat. No. 712,340 A | 1902 Oct. 28 | William H Silver | Toaster |

Of the above-mentioned devices, 1 & 2 are the only ones that employ perpendicular action, or rather placement of the food to be cooked at a 90° angle relative to the plain of the heat source beneath (and therefore cooking both sides simultaneously). However, 1 & 2 are substantially broilers used for many types of foods (especially meats) and they are not purpose built for toasting bread. These devices substantially rely on ascending hot air (convection) directed onto opposite sides in order to cook, but not toast, the food. As such they are very unlike an electric toaster in which a resistance element casts diffuse infrared radiation (IR) directly onto a bread slice. With devices 1 & 2, toasting bread will be very unsatisfactory.

Furthermore, these devices employ separated layers of metal below the perpendicularly placed food items. However these layers are meant to both direct the hot air to opposite sides for broiling of food as well as to catch the food's runoff, such as juice and fat, and to channel that runoff away from the device. The metal layers above the bottom most one are not intended to protect nor do they protect the food from burning. In addition, the choice of metal for the composition of these devices is based entirely on criteria such as workability, cost and weight. The IR reflectivity of the metal is ignored and irrelevant to their purpose. Finally, these devices lack the greatly variable width and maneuverability in their internal spaces to accommodate most, if any, sandwiches or other thick food items like bagels.

Devices 3 through 6 are indeed purpose built stovetop bread toasters but they lack the basic principle of perpendicular action and therefore one must flip the bread to toast both sides, while one side is always exposed to cooling from the open air. Furthermore their fundamental designs and materials (metal choice) are not based on efficiently creating and/or directing IR onto the surface of the bread, which is a critical function of a toaster. In addition, none of the cited devices can effectively toast a sandwich, not only because the sandwich would fall off the narrow ledge intended for a slice but more importantly because the constant open air exposure of the out facing side would not permit necessary "oven warming" of the insides of the sandwich.

None of the above prior inventions (1 through 6) employ materials or mechanisms for generating and boosting diffuse IR in the plane that constitutes the base of the device, e.g. in the plane where the device rests upon the cooktop.

BRIEF SUMMARY OF THE INVENTION

Vis-à-vis the above mentioned related art, this invention employs the combined action of 3 elements to accomplish a much better toasting:

(1) two rectangular IR diffusers attached on either side of a;

(2) double layered, air filled heat shield that protects the food contents from burning; and (3) the internal side walls of the toaster, which efficiently reflect IR onto the food contents in the toaster. This invention exploits the beneficial properties of certain sheet metals, and, in particular, the chromium oxide surface coating that is inherent to stainless steel, the preferred material.

The IR diffusers, in the case of gas and induction cooktops, serve to convert the energy from below into IR that then strikes the bread slice directly and indirectly, after bouncing off the chromium oxide layer of the internal walls of the device. Material choice for the diffusers is important for this invention. Stainless steel is preferred because of its good IR emissivity, durability and low cost, relative to potential alternatives.

The heat shield, consisting of two separate layers of stainless steel, has an approximately 1 cm thick stratum of air between the layers. Because air is an ideal insulator with very low thermal conductivity, the heat from a gas or electric burner does not burn the bottom edge of the bread, which is less than 2 cm above.

When used on an electric cooktop, the diffusers are not required to generate useful diffuse IR, and may be optionally removed since the heat shield has slots that allow for the insertion and removal of the diffusers. In this use case, the heat shield and the reflective internal sidewalls of the device remain critical to producing an excellent toasting result.

This invention was designed specifically for small kitchens—in apartments, townhouses, boats, motorhomes, etc. These kitchens have precious little countertop space and not enough to host an electric toaster. Accordingly, like several of the prior art examples, the present invention folds flat for easy stowage and reduced space occupation.

DETAILED DESCRIPTION OF THE INVENTION

Figure 1:
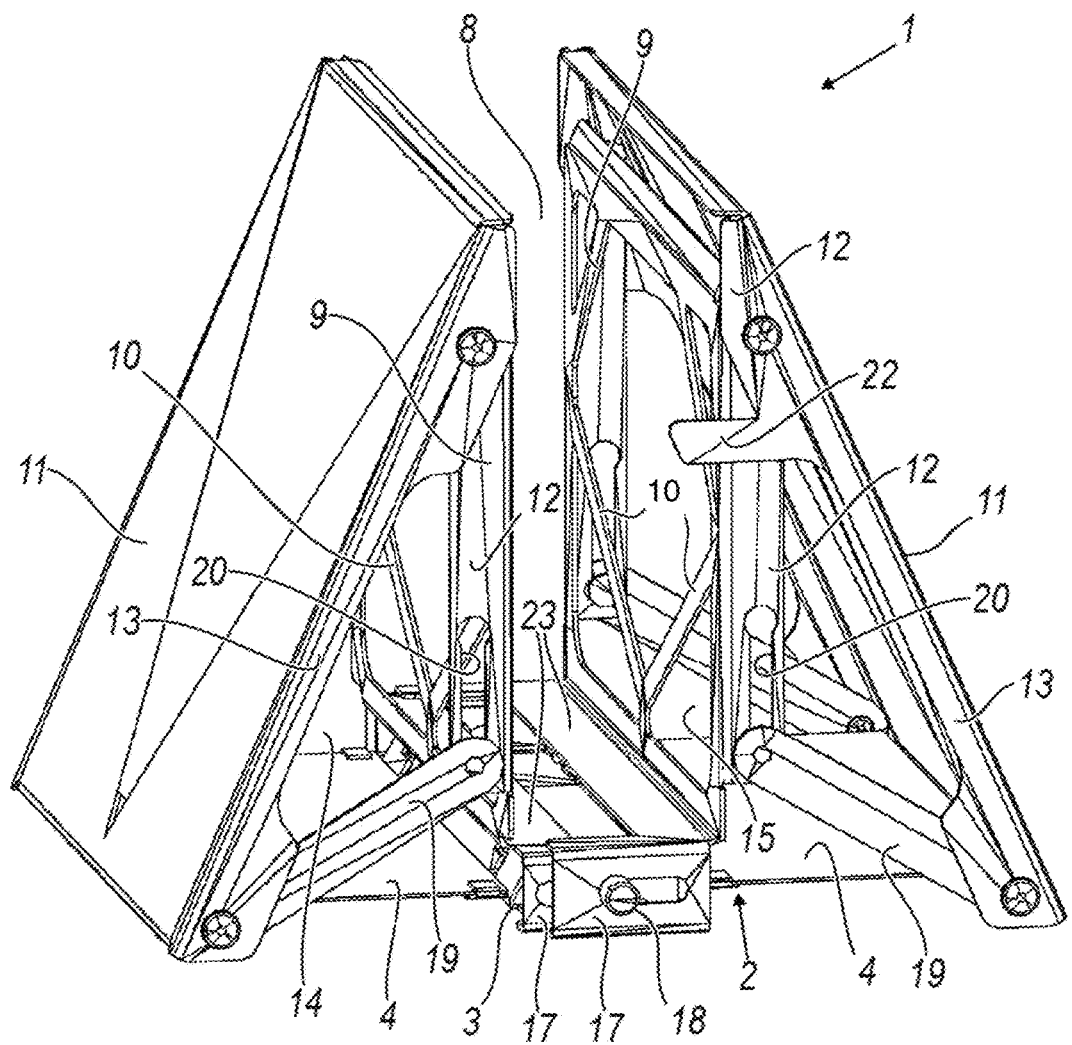
FIG. 1 is an external view of the toaster in the open position with the adjustable bread sot at the widest setting (sandwich compatible)

The toaster in FIG. 1 can be used on gas and electric cooktops and, with appropriate materials for the body of the toaster [1] (e.g. non-magnetic stainless steel) and the IR diffusers [4], potentially on induction cooktops as well.

Figure 2:
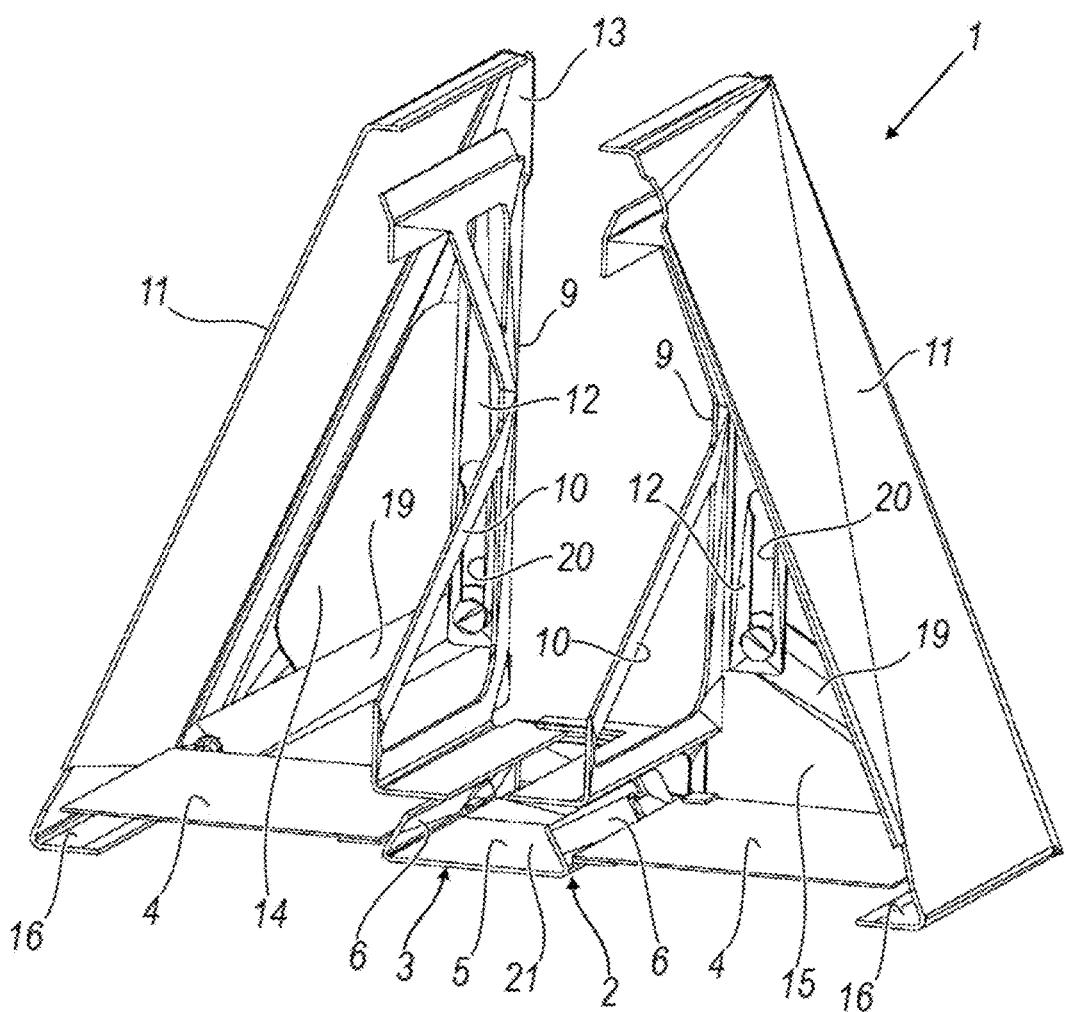
FIG. 2 is a fragmentary view also in the open position better showing the inside of the device

The toaster in the open position [1] has a support base [2] to be placed directly on the flat surface or grill of the cooktop. The support base has at it's center a rectangular base plate [5 or FIG. 3] which acts as the lower layer of a protective heat shield. On each side of the base plate [5] two rectangular IR diffusers [4] are attached by insertion into slots [6A, FIG. 3]. These diffusers are made of a metal or other durable material that can efficiently transmit the infrared radiation (IR) that they generate by converting the energy sourced from below (typically flame). The sidewalls of the device [11] are bent at an acute angle at the lowest point [FIG. 2, 16]. These bends, together with the base plate [5] constitute the weight bearing support base [2] when in the open position.

Once the toaster is placed and centered on the heat source, the user can introduce bread slices of varying thicknesses and shapes into the bread slot [8] by lowering from above or laterally sliding them in. At the rear end of the bread slot is a blocking tab [22] that prevents the food contents from sliding off the back end onto the cooktop. One significant advantage of the open design of the adjustable bread slot [8] is that it can easily receive contents of various sizes and shapes: from bagels and sandwiches; to thick and irregular, non planar hand cut bread slices; to thin, perfectly planar pre-sliced bread. This eliminates to some degree the frustrating experience that can occur with electric toasters when the bread won't fit well inside the carriage, which therefore jams or does not pop back up correctly.

The food contents in the bread slot are held securely in the upright position when the user manually brings the unit's two sides close together and the internal frames [9] come to touch the contents from both sides. The internal frames [9] have diagonal elements [10] that both strengthen the frames against torsion and provide support in strategic lower areas of the bread slot [8] that props the contents into the perpendicular position.

The toasted item stands upon an upper shelf [23] the width of which is established by the variable distance between the two sides of the toaster. The upper shelf [23] is the second layer of the heat shield that, together with the base plate [5], constitute a double layered heat shield. In between the plate [5] and the shelf [23] is an empty space [21] with an approximately 1 cm thick stratum of air, which, due to its very low thermal conductivity, protects the lower edge of the toaster's food content from getting burned.

When the cooktop is on, the IR diffusers [4] incandesce, converting the energy from below to IR and radiating it upwards. Some of the IR travels linearly (directly) to the food contents. Critically, much of the IR strikes the bread indirectly, as it rebounds off the inside walls of the toaster [11] which are preferably made of stainless steel. Chromium oxide constitutes the essential, rust preventing surface coating of stainless steel. Chromium oxide is also very efficient at reflecting IR and this contributes to the excellent toasting results of the present invention, yielding a uniform toasting from bottom to top on the slice and with cook times that are no longer and in some cases shorter than electric toasters.

Figure 3:
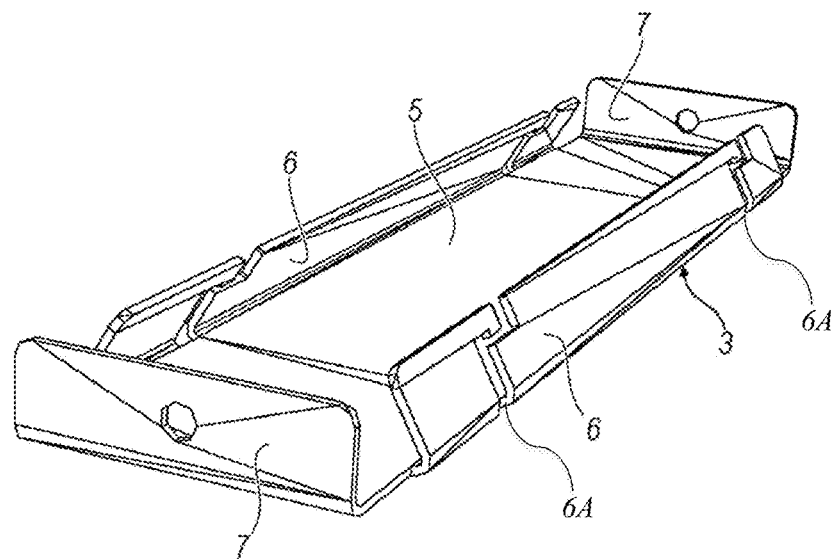
FIG. 3 is a close up of the bottom layer of the heat shield showing the slots where the IR diffusers are coupled
Figure 5:
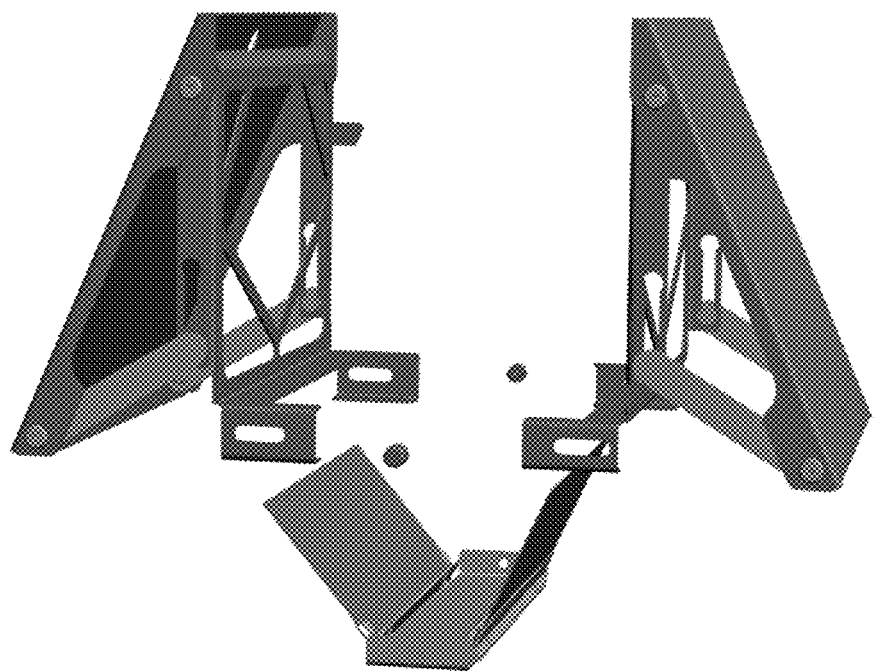
FIG. 5 shows how the toaster disassembles into 3 subassemblies to facilitate cleaning and the insertion and removal of IR diffusers

The usable length of the device can be varied and corresponds to that of the base plate [FIG. 3 or 5] and sidewalls [11]. The longer it is the more food contents can be toasted at once. Preferable lengths are in the 14 to 20 cm range. A length shorter than 14 harmfully restricts the amount of food that can be toasted. Over 20 cm and the device begins to become cumbersome, particularly since it is designed for small kitchens such as those on boats, motorhomes and small apartments, where even slight size differences become meaningful.

Figure 4:
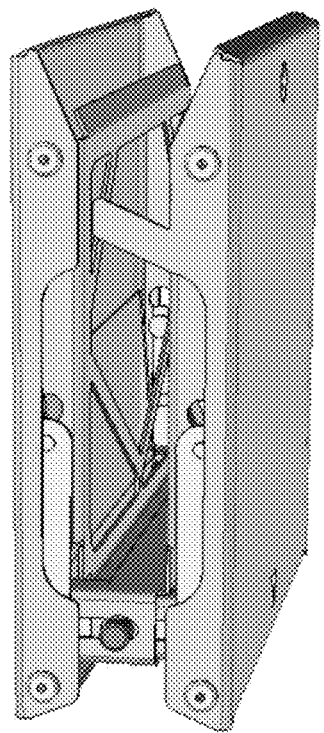
FIG. 4 shows the toaster in the compact, closed position

Accordingly, the toaster is made to quickly fold flat (FIG. 4) so that it can be stowed easily in a small space. Four rivets at the tops of the sidewalls [11] permit the sidewalls to close down around the internal frames [9], which are sized to fit snugly inside the sidewalls. The bottom ends of the sidewalls are also free to close in on the internal frames since they, too, are attached by rivets to four sliding struts [19]. When the toaster is in the open position [1] these struts maintain the sidewalls [11] at a fixed distance from the frames. The struts [19], at the opposite ends from their rivets, have small cleats that slide within tracks [20] cut from the sides of the frames [12]. By sliding up these tracks, the struts effectively lead the bottom ends of the sidewalls [11] into a coupling with the frames (FIG. 4).

In the closed position, the IR diffusers [4] fit snugly in the narrow space between the sidewalls [11] and the internal frames [9]. The diffusers are free to fold upwards to a perpendicular position relative to the base plate due to the bend at an acute angle of the plate's sidewalls [6]. In the closed position the toaster assumes a shape and volume comparable to a hardcover book and thus can be stowed conveniently in various above, below and between spaces as is done with a book.

To afford the toaster a variable width bread slot, but also to facilitate its cleaning as well as the removal and insertion of IR diffusers, the toaster disassembles into 3 main subassemblies (FIG. 5). The base plate [5] with its attached diffusers [4] slide into the guide rails [17] of the "child" frame [right side subassembly of FIG. 5]. Together both these subassemblies then slide into the guide rails of the "mother" frame [left side subassembly]. All three subassemblies are held securely together when fasteners [18] that are screwed loosely through the rails and into rigid contact with the sides [7] of the base plate [5].

The invention claimed is:

1. A stovetop toaster for toasting of food contents of various thicknesses, the stovetop toaster comprising:
   a support base comprising:
      a base plate comprising:
         a front side; and
         a back side opposite the front side;
      a first subassembly comprising:
         a first sidewall;
         a first frame having a first front cutout track and a first back cutout track;

a first upper pair of rivets connect the first sidewall to the first frame;
a first front strut having a first front rotatable end attached to the first sidewall by a first front rivet and a first front moveable end having a first front cleat slidable along the first front cutout track;
a first back strut having a first back rotatable end attached to the first sidewall by a first back rivet and a first back moveable end having a first back cleat slidable along the first back cutout track;
a first upper shelf;
a first front guide rail; and
a first back guide rail;
a second subassembly comprising:
a second sidewall;
a second frame having a second front cutout track and a second back cutout track;
a second upper pair of rivets connect the second sidewall to the second frame;
a second front strut having a second front rotatable end attached to the second sidewall by a second front rivet and a second front moveable end having a second front cleat slidable along the second front cutout track;
a second back strut having a second back rotatable end attached to the second sidewall by a second back rivet and a second back moveable end having a second back cleat slidable along the second back cutout track;
a second upper shelf;
a second front guide rail; and
a second back guide rail;
a front fastener screwing loosely through the first front guide rail and the second front guide rail, the front fastener being in a rigid contact with the front side of the base plate; and
a back fastener screwing loosely through the first back guide rail and the second back guide rail, the back fastener being in a rigid contact with the back side of the base plate.

2. The stovetop toaster of claim 1 further comprising a first diffuser and a second diffuser;
wherein the support base further comprises a first plurality of slots and a second plurality of slots;
wherein a side of the first diffuser is inserted into the first plurality of slots of the support base; and
wherein a side of the second diffuser is inserted into the second plurality of slots of the support base.

3. The stovetop toaster of claim 2, wherein the first diffuser and the second diffuser are made of stainless steel.

4. The stovetop toaster of claim 2, wherein the first upper shelf, the second upper shelf and the base plate form a double layered heat shield.

5. The stovetop toaster of claim 4, wherein a distance between the first upper shelf and the base plate is one centimeter so as to prevent a lower portion of the food contents from being burned.

6. The stovetop toaster of claim 2, wherein the base plate slides into the first front guide rail and the first back guide rail; and
wherein the base plate, the first front guide rail and the first back guide rail slide into the second front guide rail and the second back guide rail so that a distance between the first frame and the second frame is adjustable.

7. The stovetop toaster of claim 6, wherein a blocking tab extends away from the second sidewall toward the first sidewall so as to prevent the food contents from sliding off a back end of the stovetop toaster.

8. The stovetop toaster of claim 2, wherein the first frame further has a first plurality of diagonal elements to strengthen the first frame; wherein the second frame further has a second plurality of diagonal elements to strengthen the second frame; and wherein the first plurality of diagonal elements and the second plurality of diagonal elements prop the food contents into a perpendicular position.

9. The stovetop toaster of claim 2, wherein the stovetop toaster is characterized by:
an open condition in which
the first front cleat is located at a lower end of the first front cutout track;
the first back cleat is located at a lower end of the first back cutout track;
the second front cleat is located at a lower end of the second front cutout track; and
the second back cleat is located at a lower end of the second back cutout track; and
a closed condition in which
the first front cleat is located at an upper end of the first front cutout track;
the first back cleat is located at an upper end of the first back cutout track;
the second front cleat is located at an upper end of the second front cutout track; and
the second back cleat is located at an upper end of the second back cutout track.

10. The stovetop toaster of claim 9, wherein the stovetop toaster is characterized by the open condition in which the first frame, the second frame, the first upper shelf and the second upper shelf define a food slot to receive the food contents.

11. The stovetop toaster of claim 9, wherein a lower end of the first sidewall is bent at an acute angle to form a first bend; wherein a lower end of the second sidewall is bent at the acute angle to form a second bend; and wherein the stovetop toaster is characterized by the open condition in which a bottom surface of the first bend, a bottom surface of the second bend and a bottom surface of the base plate are co-planar.

12. The stovetop toaster of claim 9, wherein the stovetop toaster is characterized by the closed condition in which the first diffuser is between the first sidewall and the first frame; the second diffuser is between the second sidewall and the second frame; and the first diffuser and the second diffuser are in a perpendicular position relative to the base plate.

* * * * *